(12) United States Patent
Zheng et al.

(10) Patent No.: US 9,500,769 B2
(45) Date of Patent: Nov. 22, 2016

(54) MONITORING SYSTEM FOR TURBULENCE OF ATMOSPHERIC BOUNDARY LAYER UNDER WIND DRIFT SAND FLOW OR SAND DUST STORM ENVIRONMENT

(71) Applicant: LANZHOU UNIVERSITY, Lanzhou, Gansu Province (CN)

(72) Inventors: Xiaojing Zheng, Lanzhou (CN); Tianli Bo, Lanzhou (CN); Yirui Liang, Lanzhou (CN); Jinghong Zhang, Lanzhou (CN); Guohua Wang, Lanzhou (CN)

(73) Assignees: LANZHOU UNIVERSITY, Lanzhou, Gansu Province (CN); Xiaojing Zheng, Lanzhou, Gansu Province (CN)

( * ) Notice: Subject to any disclaimer, the term of this patent is extended or adjusted under 35 U.S.C. 154(b) by 206 days.

(21) Appl. No.: 14/403,356

(22) PCT Filed: Nov. 28, 2012

(86) PCT No.: PCT/CN2012/001592
§ 371 (c)(1),
(2) Date: Jan. 9, 2015

(87) PCT Pub. No.: WO2013/173956
PCT Pub. Date: Nov. 28, 2013

(65) Prior Publication Data
US 2015/0168600 A1    Jun. 18, 2015

(30) Foreign Application Priority Data
May 24, 2012    (CN) .......................... 2012 1 0164114

(51) Int. Cl.
*G01W 1/00*    (2006.01)
*G01W 1/02*    (2006.01)

(52) U.S. Cl.
CPC .............. *G01W 1/00* (2013.01); *G01W 1/02* (2013.01); *G01W 2001/003* (2013.01)

(58) Field of Classification Search
USPC ........................................ 73/170.16, 170.18
See application file for complete search history.

(56) References Cited

U.S. PATENT DOCUMENTS

| 2008/0019299 A1* | 1/2008 | Lekutai | G01W 1/02 370/328 |
| 2014/0144227 A1* | 5/2014 | Zheng | G01W 1/02 73/170.05 |

FOREIGN PATENT DOCUMENTS

| CN | 201043947 Y | 4/2008 |
| CN | 102681030 A | 9/2012 |
| CN | 202583492 U | 12/2012 |

OTHER PUBLICATIONS

Ding, Guoan et al., Low altitude wind characteristics in Wuhan district, Professional Papers of Diffusion in Atmospheric Turbulence & Pollution, Sep. 1982, pp. 50-62.
Li, Qiusheng et al., Observation of wind profile & analysis of atmosphere boundary layer inurban areas, China Civil Engineering Journal, Dec. 2009, vol. 42, No. 12, pp. 83-90.

* cited by examiner

*Primary Examiner* — Clayton E Laballe
*Assistant Examiner* — Warren K Fenwick
(74) *Attorney, Agent, or Firm* — Jiwen Chen

(57) ABSTRACT

A monitoring system for turbulence of the atmospheric boundary layer under a wind drift sand flow environment includes: a meteorological tower, a hot-wire bracket and a plurality of observation frames, which are vertically and cooperatively arranged in parallel. The hot-wire bracket is arranged close to the meteorological tower, and the plurality of observation frames are symmetrically distributed on the two sides of a region formed by the meteorological tower and the hot-wire bracket. The meteorological tower is cooperatively provided thereon with a first group of experimental instruments for measurements; the hot-wire bracket is cooperatively provided thereon with a hot-wire probe assembly; and each observation frame is cooperatively provided thereon with a second group of experimental instruments for measurements. The monitoring system can realize advantages of measuring a wall turbulence 3D structure with a high Reynolds number, measuring flow field characteristics, and synchronizing turbulence measurement with sand dust transport measurement.

10 Claims, 2 Drawing Sheets

MONITORING SYSTEM FOR TURBULENCE OF ATMOSPHERIC BOUNDARY LAYER UNDER WIND DRIFT SAND FLOW OR SAND DUST STORM ENVIRONMENT

This is a U.S. national stage application of PCT Application No. PCT/CN2012/001592 under 35 U.S.C. 371, filed Nov. 28, 2012 in Chinese, claiming the priority benefit of Chinese Application No. 201210164114.0, filed May 24, 2012, which is hereby incorporated by reference.

TECHNICAL FIELD

The present invention involves meteorological monitoring, or to be specific, monitoring system for turbulence of atmospheric boundary layer under a wind drift sand flow or sand dust storm environment.

BACKGROUND TECHNOLOGY

A flow field of gas-solid two-phase flow consisting of air and sands (with grain size above 100 μm), and air and sand dusts (with grain size below 100 μm) is of common occurrence in desertification region. The former is mostly concentrated within the height less than 2 meters away from the ground, also referred to as surface wind drift sand flow (i.e., a form of soil wind erosion and desertification), and aggravates soil wind erosion and desertification accordingly. The latter mainly concerns sand dust storm within the height less than 10 meters away from the ground, and often leads to traffic stop, communication outage and air quality reduction, or even house and crop damage, loss of life and personal injury.

For example, about 1,325,600 persons in 19 counties of Gansu Province were hit by the sand dust storm on Apr. 24-25, 2010; crop damage area reached 206,800 hectares (ha). Though prevention and control or forecast of wind drift sand or sand dust storm has been studied for decades of years, and local treatment has achieved certain effect, the condition is severe on the whole: on one hand, the area of soil wind erosion and desertification continues to spread, the condition is more severe, and cultivated land area decreases. For example, a wind-sand disaster makes current area of desertification in Minqin area of Gansu Province which was an oasis 50 years ago reach about 94.5%. On the other hand, sand dust storm is still frequent; for example, Minqin area suffered 8 times of sand dust storm in 2010, and Riyadh (capital of Saudi Arabia) and Sydney in Australia in 2009, and the Phoenix of Arizona in the United States in 2011 respectively suffered the most severe sand dust storm over 20 years. It is thus clear that wind drift sand and sand dust storm has become an important environmental issue affecting human, economic and social development.

As pointed out by Balachandar et al. in an article of *Annual Review of Fluid Mechanics*: "Turbulence and multiphase flow are the two most challenging issues in fluid mechanics and it will be a more difficult challenge when combining the two". Meanwhile, Marusic et al pointed out in a review article in 2010 that: "Recently, turbulence of wall boundary under high Reynolds number has gradually become a hot research field. There remain many challenges with regard to theory of such issue, scaling law, understanding of physical process, experimental technique, and numerical simulation." Therefore, understanding and revealing of features and rules of wind drift sand flow or sand dust storm—turbulence of high Reynolds number of atmospheric boundary layer—will play a key role in accurate forecast of transport rate of wind drift sand flow and improvement of forecast model of sand dust storm, which reflects important application requirements, and will become an extremely complicated and challenging scientific issue.

However, with regard to study on wall turbulence of high Reynolds number (Re), understanding of basic issues such as concrete form of mean flow profile of wall turbulence, rule of turbulence fluctuation intensity change with Re, origin and scale of large scale structure outside and its spatial-temporal evolution rule, and existence of spectrum of "−1" power remains in dispute. Moreover, such basic theory issues concerning wall turbulence of high Re are highly relevant to forecast of transport rate of wind drift sand flow and improvement of forecast accuracy of sand dust storm. For example, value of Von Karman's constant and profile form will have direct influence on numerical calculation of wind drift sand flow or sand dust storm evolution process, but position in lower limit of mean flow profile may have influence on dust emission.

For study on turbulence of atmospheric boundary layer, there are issues such as short time of measurement of turbulence structure of atmospheric boundary layer, and unclear influence of factors including temperature stratification surface roughness and characteristics of incoming flow, etc. Therefore, it makes a lot of differences between the acquired results on one hand, and disputable understanding of basic issues such as universality of The Monin Obukhov theory, various anisotropic characteristics of fluctuation intensity, generation mechanism of coherent structure, as well as characterization of spectral of wind speed on the other hand. For the study on characteristics of wind drift sand flow or sand dust storm flow field, existing studies on exploration of relevance of wind drift sand flow and sand dust storm to turbulence structure are mostly speculative, especially for such extremely important issues on understanding and forecasting of wind drift sand flow or sand dust storm such as flow field characteristics and flow structure of wind drift sand flow or sand dust storm and interaction with dust emission and sand dust transport, it is hard for existing observation instruments and observation data to offer accurate answer, and it is unknown about whether existing conclusions, such as field observation conclusion of the University of Utah, can be introduced to flow field during wind drift sand flow or sand dust storm period.

It is thus clear that more effective field observation of flow field characteristics and structure of wind drift sand flow or sand dust storm of ground layer is necessary.

When realizing the present invention, the inventors found several defects of existing technology such as failure to measure three-dimensional structure of wall turbulence of high Reynolds number, failure to measure flow field characteristics of wind drift sand flow or sand dust storm, and failure to synchronize turbulence measurement with sand dust transport measurement, etc.

SUMMARY OF THE INVENTION

The present invention aims at recommending a monitoring system for turbulence of the atmospheric boundary layer under a wind drift sand flow or sand dust storm environment specific to above issues to realize advantages including measurement of three-dimensional structure of wall turbulence of high Reynolds number, measurement of flow field characteristics of wind drift sand flow or sand dust storm, and synchronization of turbulence measurement with sand dust transport measurement.

Technical proposal adopted in the present invention to achieve above objects is: a monitoring system for turbulence of the atmospheric boundary layer under a wind drift sand flow or sand dust storm environment, comprising a meteorological tower, a hot-wire bracket and a plurality of observation frames, which are vertically and cooperatively arranged in parallel. The hot-wire bracket is arranged close to the meteorological tower, and the plurality of observation frames are symmetrically distributed on the two sides of a region formed by the meteorological tower and the hot-wire bracket. The meteorological tower is cooperatively provided thereon with a first group of experimental instruments for measurements; the hot-wire bracket is cooperatively provided thereon with a hot-wire probe assembly; and each observation frame is cooperatively provided thereon with a second group of experimental instruments for measurements.

The observations frames, meteorological tower and hot-wire bracket are further arranged as a pyramid on a horizontal plane.

In the plurality of observation frames, each observation frame is further an observation frame of 12-20 m.

The first group of experimental instruments for measurements further comprises a data acquisition unit, a plurality of sand transporting intensity probes located in upper side of the data acquisition unit and horizontally installed on transverse connecting pole of the meteorological tower in parallel, and a plurality of measuring units located above the plurality of sand transporting intensity probes and horizontally installed on transverse connecting pole of the meteorological tower in parallel; the plurality of sand transporting intensity probes and plurality of measuring units are respectively cooperatively connected with the data acquisition unit.

In the plurality of measuring units, each measuring unit further comprises a three-dimensional ultrasonic anemograph located on one side of the meteorological tower, and a hygrothermograph and dust gauge located on the other side of the meteorological tower; the three-dimensional ultrasonic anemograph, hygrothermograph and dust gauge are respectively cooperatively connected with the data acquisition unit.

The hot-wire probe assembly further comprises a mobile terminal, and a plurality of hot-wire probes located above the mobile terminal and horizontally installed on a transverse connecting pole of the hot-wire bracket in parallel; both ends of each transverse connecting pole are equipped with two hot-wire probes located on both sides of the hot-wire bracket; each hot-wire probe is respectively connected with the mobile terminal.

The mobile terminal further at least comprises a notebook computer.

The second group of experimental instruments for measurements further comprises a data acquisition unit, a plurality of sand transporting intensity probes located in upper side of the data acquisition unit and horizontally installed on transverse connecting pole of observation frames in parallel, and a plurality of measuring units located above the plurality of sand transporting intensity probes and horizontally installed on transverse connecting pole of observation frames in parallel; the plurality of sand transporting intensity probes and plurality of measuring units are respectively cooperatively connected with the data acquisition unit.

In the plurality of measuring units, each measuring unit further comprises a three-dimensional ultrasonic anemograph of model CAST3 located on one side of observation frames, and a hygrothermograph of model HMP45C and dust gauge of model AQ-10 located on the other side of observation frames; the three-dimensional ultrasonic anemograph of model CAST3, hygrothermograph of model HMP45C and dust gauge of model AQ-10 are respectively cooperatively connected with the data acquisition unit.

Above said monitoring system for turbulence of atmospheric boundary layer under a wind drift sand flow or sand dust storm environment further comprises a data line used to connect corresponding experimental instruments with the data acquisition unit or mobile terminal, and a power supply system used to supply power for electric equipment.

Since the monitoring system for turbulence of atmospheric boundary layer under a wind drift sand flow or sand dust storm environment of each embodiment in the present invention comprises a meteorological tower, a hot-wire bracket and a plurality of observation frames, which are vertically and cooperatively arranged in parallel, where the hot-wire bracket is arranged close to the meteorological tower, the plurality of observation frames are symmetrically distributed on the two sides of a region formed by the meteorological tower and the hot-wire bracket; the meteorological tower is cooperatively provided thereon with a first group of experimental instruments for measurements; the hot-wire bracket is cooperatively provided thereon with a hot-wire probe assembly; and each observation frame is cooperatively provided thereon with a second group of experimental instruments for measurements, it can realize omnibearing, real-time, synchronous and high-frequency measurement of wind velocity, dust concentration, sand transporting intensity and humiture under the condition of field high Reynolds number to overcome defects of existing technology such as failure to measure three-dimensional structure of wall turbulence of high Reynolds number, failure to measure flow field characteristics of wind drift sand flow or sand dust storm, and failure to synchronize turbulence measurement with sand dust transport measurement, and realize advantages including measurement of three-dimensional structure of wall turbulence of high Reynolds number, measurement of flow field characteristics of wind drift sand flow or sand dust storm, and synchronization of turbulence measurement with sand dust transport measurement.

Other features and advantages of the present invention will be illustrated in subsequent specification, and partially become visible in the specification, or be understood through implementation of the present invention. Purpose and other advantages of the present invention may be realized and acquired through structures pointed out specifically in the prepared specification, claims and attached drawings.

Technical proposal of the present invention will be further described in detail through following attached drawings and embodiments.

BRIEF DESCRIPTION OF THE DRAWINGS

The attached drawings are for further understanding of the present invention, and constitute an integral part of the specification to be used for explanation of the present invention together with embodiments of the present invention, but do not constitute a limit to the present invention. In the attached drawings.

In the light of the attached drawings, attached drawings in embodiments of the present invention are marked as follows:
1—Data acquisition unit; 2—Sand transporting intensity probe; 3—Three—dimensional ultrasonic anemograph; 4—Dust gauge; 5—Hygrothermograph; 6—Meteorological tower; 7—Notebook computer; 8—Hot—wire probe; 9—Hot—wire bracket; 10—Observation frames of 16 m.

EMBODIMENTS OF THE INVENTION

Preferred embodiments of the present invention are described as follows in the light of the attached drawings; it should be understood that preferred embodiments described here are for description and explanation of the present invention only, but not to limit the present invention.

A monitoring system for turbulence of atmospheric boundary layer under a wind drift sand flow or sand dust storm environment is provided based on embodiments of the present invention. As shown in FIG. 1-FIG. 4, the present embodiment includes a meteorological tower (such as meteorological tower 6), a hot-wire bracket (such as hot-wire bracket 9) and a plurality of observation frames, which are vertically and cooperatively arranged in parallel. The hot-wire bracket is arranged close to the meteorological tower, and the plurality of observation frames are symmetrically distributed on the two sides of a region formed by the meteorological tower and the hot-wire bracket. The meteorological tower is cooperatively provided thereon with a first group of experimental instruments for measurements; the hot-wire bracket is cooperatively provided thereon with a hot-wire probe assembly; and each observation frame is cooperatively provided thereon with a second group of experimental instruments for measurements; it also includes a power supply system (such as a power supply system mainly comprising a solar panel and a storage battery) used to supply power for electric equipment. In the plurality of observation frames, each observation frame is an observation frame of 12-20 m (but an observation frame 10 of 16 m is preferred).

Figure 1:
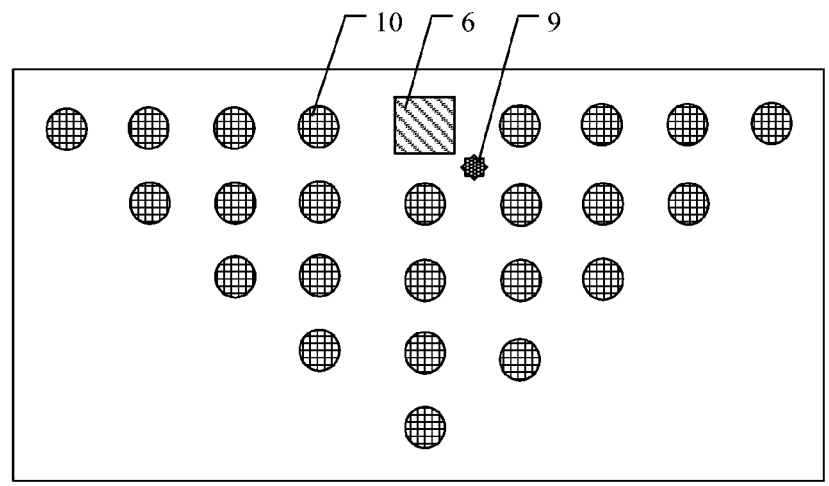
FIG. 1 schematically shows a pyramidal arrangement of the meteorological tower, hot-wire bracket and plurality of observation frames of 16 m on a horizontal plane the monitoring system for turbulence of atmospheric boundary layer under a wind drift sand flow or sand dust storm environment according to the present invention.

As shown in FIG. 1, the plurality of observation frames, meteorological tower and hot-wire bracket as said above are arranged as a pyramid on a horizontal plane. The meteorological tower and plurality of observation frames of 16 m are arranged on a horizontal plane in the form of triangle array, which enables measurement of the turbulence structure in different incoming flow directions, and the form is similar to the pyramid in Egypt from the perspective of three-dimension.

Figure 2:
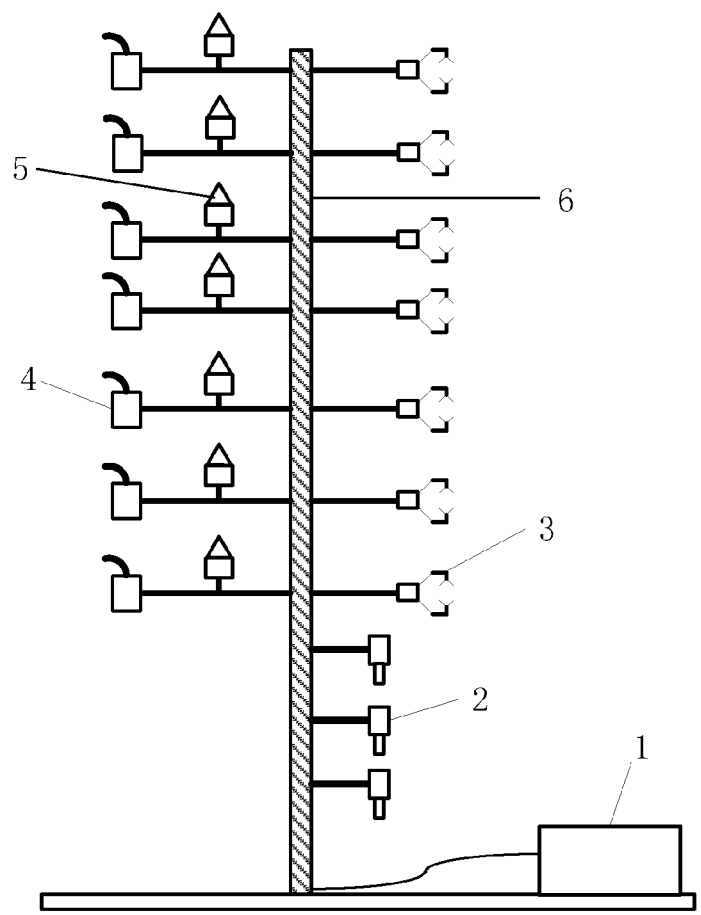
FIG. 2 schematically shows an assembly structure of experimental instruments for measurements on the meteorological tower in the monitoring system for turbulence of atmospheric boundary layer under a wind drift sand flow or sand dust storm environment.

As shown in FIG. 2, the first group of experimental instruments for measurements as said above comprises a data acquisition unit (such as data acquisition unit 1), a plurality of sand transporting intensity probes located in upper side of the data acquisition unit and horizontally installed on transverse data line connecting pole of the meteorological tower in parallel (such as sand transporting intensity probe 2), and a plurality of measuring units located above the plurality of sand transporting intensity probes and horizontally installed on transverse data line connecting pole of the meteorological tower in parallel; the plurality of sand transporting intensity probes and plurality of measuring units are respectively cooperatively connected with the data acquisition unit through the data line. In the plurality of measuring units, each measuring unit comprises a three-dimensional ultrasonic anemograph (such as three-dimensional ultrasonic anemograph 3) located on one side of the meteorological tower, and a hygrothermograph (such as hygrothermograph 5) and dust gauge (such as dust gauge 4) located on the other side of the meteorological tower; the three-dimensional ultrasonic anemograph, hygrothermograph and dust gauge are respectively cooperatively connected with the data acquisition unit through the data line.

In FIG. 2, the plurality of sand transporting intensity probes may be 3 measuring units, and the plurality of measuring units may be 7 measuring units.

For example, the three-dimensional ultrasonic anemograph, dust gauge and hygrothermograph may be installed on the meteorological tower from bottom to top at the height of 0.2 m, 0.5 m, 1 m, 2 m, 4 m, 8 m, 12 m, 16 m, 24 m and 32 m, respectively; the sand transporting intensity probes may be installed on the bottom of the meteorological tower at the height of 0.05 m, 0.1 m, 0.15 m, 0.2 m and 0.3 m, respectively; two sets of three-dimensional ultrasonic anemograph, two sets of dust gauge, two sand transporting intensity probes and one hygrothermograph may be respectively installed on observations frames of 16 m.

Figure 3:
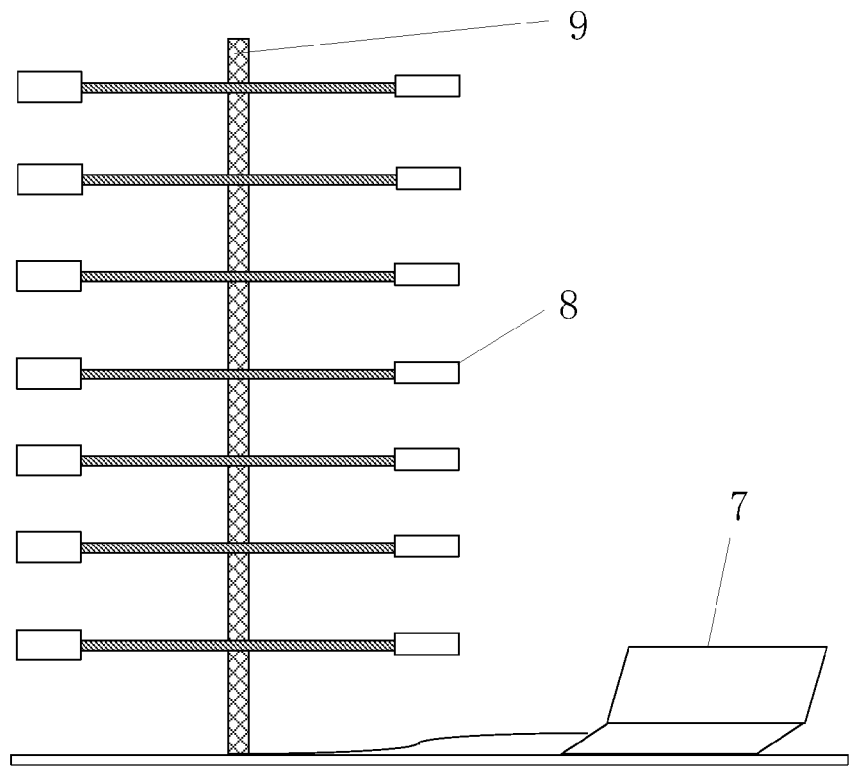
FIG. 3 schematically shows an assembly structure of hot-wire probe on the hot-wire bracket in the monitoring system for turbulence of atmospheric boundary layer under a wind drift sand flow or sand dust storm environment according to the present invention.

As shown in FIG. 3, the hot-wire probe assembly as said above comprises a mobile terminal (such as notebook computer 7), and a plurality of hot-wire probes located above the mobile terminal and horizontally installed on transverse data line connecting pole of the hot-wire bracket in parallel; both ends of each transverse data line connecting pole are equipped with two hot-wire probes located on both sides of the hot-wire bracket; each hot-wire probe is respectively connected with the mobile terminal through the data line.

In FIG. 3, 16 hot-wire probes of field hot-wire anemograph may be installed at different heights of the hot-wire bracket, and each hot-wire probe is connected with the notebook computer used for data acquisition through the data line.

Figure 4:
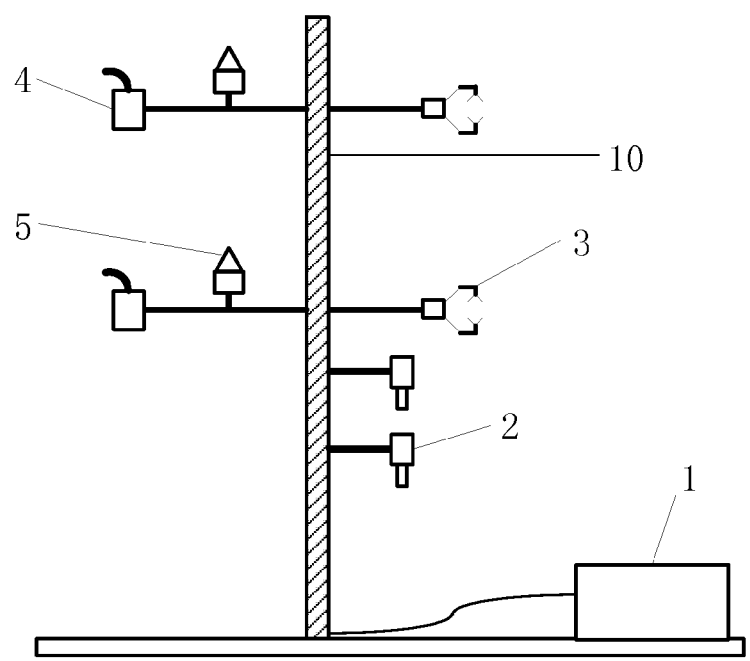
FIG. 4 schematically shows an assembly structure of experimental instruments for measurements on observation frames of 16 m in the monitoring system for turbulence of atmospheric boundary layer under a wind drift sand flow or sand dust storm environment according to the present invention.

As shown in FIG. 4, the second group of experimental instruments for measurements comprises a data acquisition unit, a plurality of sand transporting intensity probes located in upper side of the data acquisition unit and horizontally installed on transverse data line connecting pole of observation frames in parallel, and a plurality of measuring units located above the plurality of sand transporting intensity probes and horizontally installed on transverse data line connecting pole of observation frames in parallel; the plurality of sand transporting intensity probes and plurality of measuring units are respectively cooperatively connected with the data acquisition unit through the data line. In the plurality of measuring units, each measuring unit comprises a three-dimensional ultrasonic anemograph of model CAST3 located on one side of observation frames, and a hygrothermograph of model HMP45C and dust gauge of model AQ-10 located on the other side of observation frames; the three-dimensional ultrasonic anemograph of model CAST3, hygrothermograph of model HMP45C and dust gauge of model AQ-10 are respectively cooperatively connected with the data acquisition unit through the data line.

In FIG. 4, the plurality of sand transporting intensity probes may be 2 measuring units, and the plurality of measuring units may be 2 measuring units.

In the embodiment as said above, the data acquisition unit is used for acquisition of data of experimental instruments for measurements on the meteorological tower and observations frames of 16 m; the sand transporting intensity probe is used for measurement of sand transporting intensity of wind drift sand flow; the three-dimensional ultrasonic anemograph is used for measurement of three-dimensional wind velocity; the dust gauge is used for measurement of dust concentration; the hygrothermograph is used for measurement of atmospheric temperature and humidity; the mobile terminal (such as notebook computer 7) is used for real-time recording of wind velocity detected by the hot-wire probe.

The monitoring system for turbulence of atmospheric boundary layer under a wind drift sand flow or sand dust storm environment in the embodiment as said above involves real-time and synchronous measurement of wind field, dust and humiture under dust emission or non-dust emission condition of the desert surface and different stratification conditions to acquire data of wall turbulence of high Reynolds number under zero pressure gradient nearly neutral condition in the circumstance of wind drift sand flow or sand dust storm; it may be used for realization of real-time and synchronous measurement of wind field, dust and humiture under dust emission or non-dust emission condition of the desert surface and different stratification conditions to acquire data of wall turbulence of high Reynolds number under zero pressure gradient nearly neutral condition in the circumstance of wind drift sand flow or sand dust storm.

To be specific, the monitoring system for turbulence of atmospheric boundary layer under a wind drift sand flow or sand dust storm environment in the embodiment as said above may include a meteorological tower (about 50-70 m), a hot-wire observation frame, dozens of observation frames at the height of about 16 m and arranged respectively in the flow direction and spanwise direction, and a three-dimensional ultrasonic anemograph, hot-wire anemograph, dust gauge, hygrothermograph, data acquisition unit and notebook computer of gradient layout on the observation frames, which constitute a three-dimensional multi-point multi-element gradient measurement system; the meteorological observation tower, hot-wire observation frame and dozens of observation frames of 16 m are arranged vertically in the form of triangle array in parallel, and the meteorological tower is equipped with a three-dimensional ultrasonic anemograph, hygrothermograph, sand transporting intensity probe and dust gauge, the hot-wire bracket is equipped with a hot-wire probe, the dozens of observation frames of 16 m are equipped with a three-dimensional ultrasonic anemograph, hygrothermograph, sand transporting intensity probe and dust gauge, and the meteorological tower, hot-wire observation frame and observation frames are independently equipped with a data acquisition unit and notebook computer.

In conclusion, since the monitoring system for turbulence of atmospheric boundary layer under a wind drift sand flow or sand dust storm environment of the embodiment as said above in the present invention includes a meteorological tower, a hot-wire observation frame and dozens of observation frames of 16 m arranged vertically in parallel, and the meteorological tower is equipped with a three-dimensional ultrasonic anemograph, dust gauge, hygrothermograph and sand transporting intensity probe, the hot-wire bracket is equipped with a hot-wire probe of outdoor hot-wire anemograph, the observation frames of 16 m are equipped with a three-dimensional ultrasonic anemograph, dust gauge, hygrothermograph and sand transporting intensity probe, the meteorological tower and dozens of observation frames of 16 m are respectively independently equipped with a data acquisition unit, the experimental instruments for measurements are connected with the data acquisition unit through the data line, and instruments on the hot-wire bracket are connected with the notebook computer through the data line, it can carry out omnibearing, real-time, synchronous and high-frequency measurement of wind velocity, dust concentration, sand transporting intensity and humiture under the condition of field high Reynolds number to overcome defects of existing technology such as failure to capture three-dimensional structure of wall turbulence of high Reynolds number to realize advantages of three-dimension, multi-factor, real time and synchronization.

It should be stated finally that what said above is just a preferred embodiment of the present invention that not used to limit the present invention. Though the present invention has been described in detail with reference to the embodiment as said above, for those of skill in the art, they may amend the technical proposal recorded in various embodiments said above, or substitute some technical features therein equivalently. Any amendment, equivalent substitution or improvement made within the spirit and principle of the present invention shall be included in the scope of protection of the present invention.

The invention claimed is:

1. A monitoring system for turbulence of an atmospheric boundary layer under a wind drift sand flow or a sand dust storm environment characterized in that the monitoring system comprises a meteorological tower, a hot-wire bracket and a plurality of observation frames, which are vertically and cooperatively arranged in parallel; wherein the hot-wire bracket is arranged close to the meteorological tower, and the plurality of observation frames are symmetrically distributed on two sides of a region formed by the meteorological tower and the hot-wire bracket; the meteorological tower is cooperatively provided thereon with a first group of experimental instruments for measurements; the hot-wire bracket is cooperatively provided thereon with a hot-wire probe assembly; and each observation frame is cooperatively provided thereon with a second group of experimental instruments for measurements.

2. The monitoring system for turbulence of the atmospheric boundary layer under a wind drift sand flow or sand dust storm environment according to claim 1 characterized in that the plurality of observation frames, meteorological tower and hot-wire bracket are arranged as a pyramid on a horizontal plane.

3. The monitoring system for turbulence of the atmospheric boundary layer under a wind drift sand flow or sand dust storm environment according to claim 1 characterized in that in the plurality of observation frames, each observation frame is an observation frame of 12-20 meters.

4. The monitoring system for turbulence of the atmospheric boundary layer under a wind drift sand flow or sand dust storm environment according to claim 1 characterized in that the first group of experimental instruments for measurements comprises a data acquisition unit, a plurality of sand transporting intensity probes located in an upper side of the data acquisition unit and horizontally installed on a transverse connecting pole of the meteorological tower in parallel, and a plurality of measuring units located above the plurality of sand transporting intensity probes and horizontally installed on the transverse connecting pole of the meteorological tower in parallel; the plurality of sand transporting intensity probes and plurality of measuring units are respectively cooperatively connected with the data acquisition unit.

5. The monitoring system for turbulence of the atmospheric boundary layer under a wind drift sand flow or sand dust storm environment according to claim 4 characterized in that in the plurality of measuring units, each measuring unit comprises a three-dimensional ultrasonic anemograph located on one side of the meteorological tower, and a hygrothermograph and dust gauge located on the other side of the meteorological tower; the three-dimensional ultrasonic anemograph, hygrothermograph and dust gauge are respectively cooperatively connected with the data acquisition unit.

6. The monitoring system for turbulence of the atmospheric boundary layer under a wind drift sand flow or sand dust storm environment according to claim 1 characterized in that the hot-wire probe assembly comprises a mobile terminal, and a plurality of hot-wire probes located above the mobile terminal and horizontally installed on transverse connecting pole of the hot-wire bracket in parallel; both ends of each transverse connecting pole are equipped with two hot-wire probes located on both sides of the hot-wire bracket; each hot-wire probe is respectively connected with the mobile terminal.

7. The monitoring system for turbulence of the atmospheric boundary layer under a wind drift sand flow or sand dust storm environment according to claim 1 characterized in that the mobile terminal at least includes a notebook computer.

8. The monitoring system for turbulence of the atmospheric boundary layer under a wind drift sand flow or sand dust storm environment according to claim 1 characterized in that the second group of experimental instruments for measurements comprises a data acquisition unit, a plurality of sand transporting intensity probes located in an upper side of the data acquisition unit and horizontally installed on a transverse connecting pole of observation frames in parallel, and a plurality of measuring units located above the plurality of sand transporting intensity probes and horizontally installed on the transverse connecting pole of observation frames in parallel; the plurality of sand transporting intensity probes and plurality of measuring units are respectively cooperatively connected with the data acquisition unit.

9. The monitoring system for turbulence of the atmospheric boundary layer under a wind drift sand flow or sand dust storm environment according to claim 8 characterized in that in the plurality of measuring units, each measuring unit comprises a three-dimensional ultrasonic anemograph of model CAST3 located on one side of observation frames, and a hygrothermograph of model HMP45C and dust gauge of model AQ-10 located on the other side of observation frames; the three-dimensional ultrasonic anemograph of model CAST3, hygrothermograph of model HMP45C and dust gauge of model AQ-10 are respectively cooperatively connected with the data acquisition unit.

10. The monitoring system for turbulence of the atmospheric boundary layer under a wind drift sand flow or sand dust storm environment according to claim 1 is characterized in that the monitoring system also includes a data line used to connect corresponding experimental instruments with the data acquisition unit or mobile terminal, and a power supply system used to supply power for electric equipment.

* * * * *